United States Patent [19]
Goldstein

[11] 4,046,686
[45] Sept. 6, 1977

[54] REVERSE OSMOSIS TREATMENT OF BATTERY WASTE

[75] Inventor: Melvin Goldstein, Mountain Brook, Ala.

[73] Assignee: Crane Co., New York, N.Y.

[21] Appl. No.: 757,528

[22] Filed: Jan. 7, 1977

Related U.S. Application Data

[63] Continuation of Ser. No. 573,185, April 30, 1975, abandoned.

[51] Int. Cl.² .............................................. B01D 13/00
[52] U.S. Cl. ................... 210/23 H; 210/42 R; 210/57
[58] Field of Search ................ 210/23, 42, 47, 49, 210/57; 136/165, 174

[56] References Cited

U.S. PATENT DOCUMENTS

| | | | |
|---|---|---|---|
| 2,304,791 | 12/1942 | Bell | 210/57 X |
| 3,476,689 | 11/1969 | Newman | 210/57 X |
| 3,580,855 | 5/1971 | Mickus et al. | 210/57 X |
| 3,795,609 | 3/1974 | Hill et al. | 210/23 H |

*Primary Examiner*—Wilbur L. Bascomb, Jr.
*Assistant Examiner*—Ferris H. Lander
*Attorney, Agent, or Firm*—Edward H. Mazer; George S. Schwind; George A. Smith, Jr.

[57] ABSTRACT

Reverse osmosis is made usable for removal of heavy metals from acid battery waste by a process in which dissolved calcium sulphate, produced by neutralization with lime, is sequestered by sodium hexametaphosphate before introduction into the permeator. The concentrated waste from the permeator is then used as a diluent for the neutralizing lime. The neutralizing lime causes the hexametaphosphate to revert to orthophosphate, whereupon calcium phosphate, and calcium sulphate are precipitated and removed.

14 Claims, 1 Drawing Figure

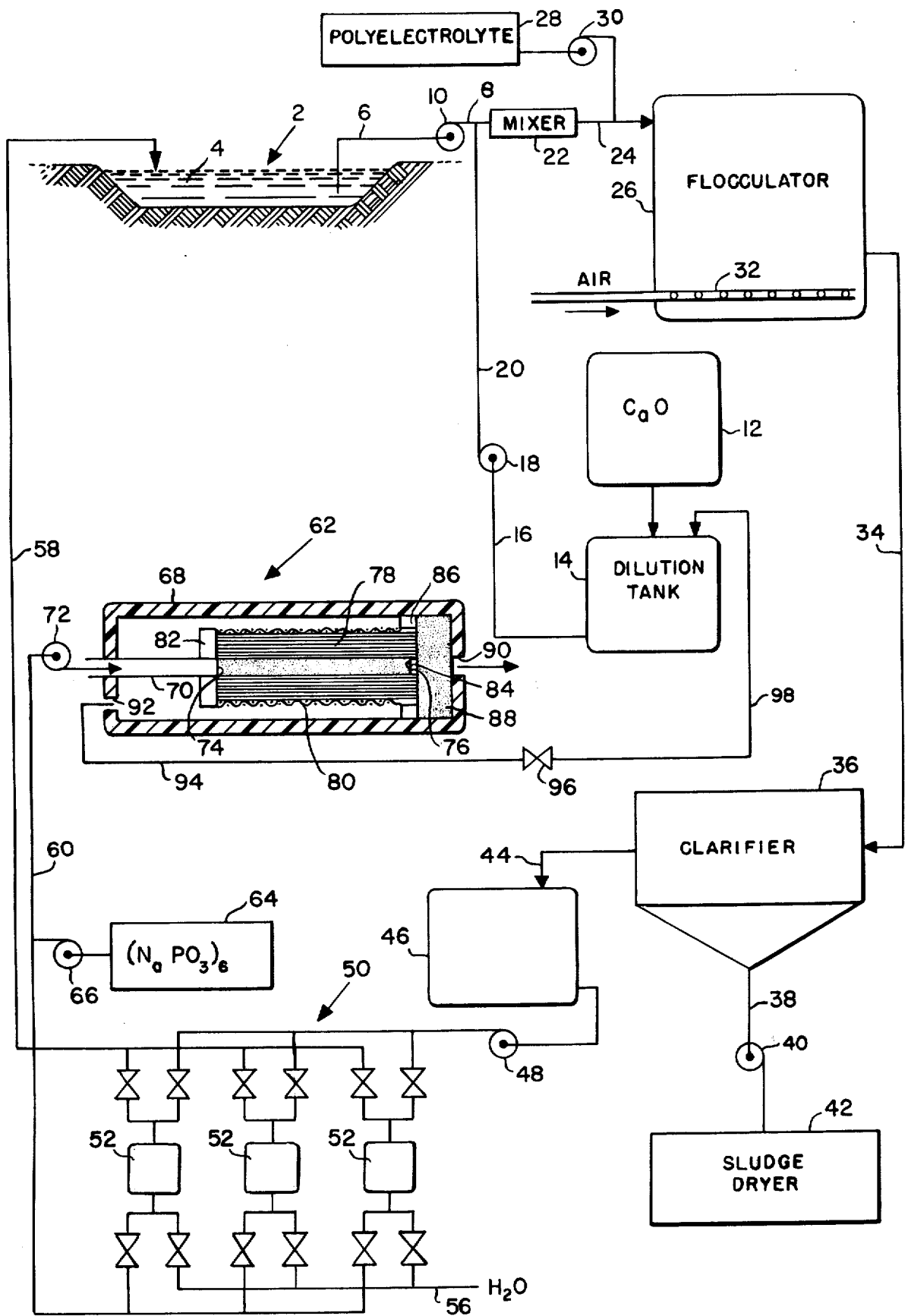

REVERSE OSMOSIS TREATMENT OF BATTERY WASTE

PRIORITY

This application is a continuation of Ser. No. 573,185, filed Apr. 30, 1975 now abandoned.

BACKGROUND OF THE INVENTION

This invention relates to a reclamation of lead-sulphuric acid storage batteries, and particularly to the treatment of liquid wastes from the reclamation process prior the disposal.

The waste material from storage battery reclamation contains large amounts of sulphuric acid along with heavy metals including large quantities of iron and smaller but still significant quantities of highly toxic metals such as lead, antimony, arsenic and copper. Because of the acidity and the presence of toxic metals, the waste must be treated prior to disposal.

Conventional treatment methods involve neutralization, followed by sedimentation for removal of suspended solids generated in neutralization and filtration. Ammonia and caustic soda are commonly used for neutralization, but because of the high solubility of the neutralization products, the salinity of the body of water receiving the discharge of the treatment process is adversely affected. Lime is also used as a neutralizing agent. Where lime is used, a great deal of calcium sulphate precipitates. However, calcium sulphate is partially soluble in water, and the resultant of the neutralization is a saturated solution of about 2000 ppm. of calcium sulphate which can also have a detrimental effect. Also in conventional treatment, precipitation and filtration do not remove heavy metals adequately, and therefore toxic quantities of heavy metal ions may remain in the discharge of the treatment process.

The main object of this invention is to provide a process for treating battery wastes which produces a discharge which is extremely low in dissolved solids and which contains negligible quantities of toxic metals.

The process includes neutralization and precipitation, and utilizes reverse osmosis in the discharge stage to insure the removal of heavy metals and dissolved calcium sulphate. As is well-known, osmosis is the process by which a liquid on one side of a semi-permeable membrane passes through the membrane into a solution on the other side, thereby reducing the concentration of the latter. The osmosis process is reversible by the application of pressure to the solution side of the membrane. In reverse osmosis, a liquid containing dissolved matter is applied under high pressure to one side of a semi-permeable membrane. Essentially pure water is forced through the membrane, and the concentration of the solution on the high-pressure side of the membrane is increased. Unfortunately, in the case of lime-neutralized battery waste, the solution is already saturated with calcium sulphate, and therefore reverse osmosis would normally result in the precipitation of solids which would foul the semi-permeable membranes. In accordance with the invention, the calcium sulphate is sequestered by the addition of a sequestering agent, preferably sodium hexametaphosphate. The addition of the sequestering agent permits reverse osmosis to taken place satisfactorily, without precipitation of calcium sulphate.

In accordance with a preferred embodiment of the invention, the solution containing sequestered calcium sulphate is returned to the precipitation stage. Lime is added to the solution and causes the hexametaphosphate to revert to orthophosphate. Calcium phosphates and calcium sulphate then precipitate and are removed in the precipitation stage. Preferably the addition of lime takes place by the use of the concentrated solution from the reverse osmosis as a diluent for the neutralizing lime.

The discharge of the system is essentially pure water, passed through the reverse osmosis membrane, containing less than 100 ppm. dissolved solids and less than 1 ppm. of heavy metal salts. Precipitated calcium sulphate, calcium phosphate, and heavy metal hydroxides are removed by clarification and filtration, and dissolved solids such as sodium salts, leave the system with the water which accompanies the precipitated matter.

BRIEF DESCRIPTION OF THE DRAWING

The single FIGURE is a schematic diagram showing the elements and interconnections in a typical system for carrying out the treatment of battery waste in accordance with the invention.

DETAILED DESCRIPTION

A waste lagoon of a battery reclaiming plant is shown at 2. This lagoon contains a body of liquid 4, consisting mainly of water and sulphuric acid, and also containing quantities of metals. The waste liquid from a battery reclaiming plant might contain typically 2000 ppm. of iron, 30 ppm. of lead 20 ppm. of antimony, 18 ppm. of arsenic, 4 ppm. of zinc and 2 ppm. of copper. Other heavy metals may be present along with these in the liquid, but generally, they will be present in much smaller concentrations. Sodium is unavoidably present in small quantities in the waste liquid.

The waste liquid in the lagoon is drawn out through line 6 and delivered to line 8 by pump 10. Dry lime (calcium oxide) in storage tank 12 is delivered into a dilution tank 14, and diluted lime (calcium hydroxide in water) is delivered through line 16, pump 18 and line 20 to line 8, where it is combined with the acid waste. The combination is delivered into a mixer 22, which is a vessel preferably provided with mechanical agitation in order to insure a complete reaction. Neutralization takes place, for the most part, in the mixer, and the neutralized waste is delivered through line 24 to flocculator 26.

The neutralization reaction produces a precipitate of calcium sulphate. A polyelectrolyte from storage tank 28 is pumped by pump 30 into line 24 into the flocculator 26 along with the neutralized waste. The polyelectrolyte, as is well-known, promotes floc formation. Air is bubbled up through the flocculator from an air-releasing pipe grid 32 to agitate the contents of the flocculator to prevent settling in the flocculator and to insure the formation of a heavy floc.

The contents of the flocculator are transported through line 34 to a clarifier 36, which is typical rake clarifier. In the clarifier, the floc settles out, and is removed as a sludge through line 38. This sludge is pumped by pump 40 to a sludge dryer 42, where water is removed by evaporation. Liquid is removed from the clarifier and delivered through line 44 to temporary storage tank 46. The liquid from tank 46 is pumped by pump 48 to a battery 50 of sand filters. Filter vessels 52 are interconnected by means of suitable piping and valving allowing continuous filtration, taking individual tanks out of operation periodically for backwashing.

Backwashing water enters through line 56, and is returned to waste lagoon 2 through line 58. The filtrate is delivered through line 60 to the reverse osmosis unit or "permeator" 62.

Sodium hexametaphosphate, in storage tank 64 is injected into line 60 by means of pump 66.

Permeator 62 typically comprises a large number of tubular vessels connected in parallel. However, in order to simplify the illustration, only one of such vessels is here shown. The vessel comprises a cylindrical housing 68 having a coaxial tube 70, which receives liquid from line 60, delivered through pump 72 under high pressure. Tube 70 is porous from location 74 to location 76, liquid being released through the pores to the exterior of the tube along the length of tube 70 between these locations. Surrounding the porous portion of tube 70 is a bundle of tightly packed fibers 78, constituting the semi-permeable membrane. These fibers are semi-permeable, aromatic polyamide tubular fibers, having an outer diameter of 85 microns and an inner diameter of 25 microns. They are available from E.I DuPont de Nemours & Co. under the trademark "PERMASEP". A cylindrical screen 80 surrounds the fibers, and an end plate 82 closes the left-hand ends thereof. Tube 70 is closed at its right-hand end by plug 84. A ring-shaped seal 86 surrounds the fibers at the right-hand end thereof, and a porous disc 88 abuts the right-hand end of the fibers in bundle 78.

In operation of the permeator, the filtrate from line 60 enters tube 70 under high pressure (eg. 400 - 1000 psig.), and is forced through the pores in tube 70 into the fiber bundle 78. Pure water passes by osmosis into the interiors of the fibers, and then passes through porous disc 88 to outlet opening 90. This water can be discharged safely or reused within the plant. Liquid containing dissolved solids finds its way through the fiber bundle 78 and screen 80 to the interior of cylindrical shell 68, from which it is removed through the opening 92 to line 94. The liquid in line 94, which contains sequestered calcium is delivered through valve 96 and line 98 into dilution tank 14, wherein it is used as a diluent for the neutralizing lime. The highly alkaline lime causes the hexametaphosphate to revert to orthophosphate. In the absence of hexametaphosphate, the calcium no longer remains sequestered, and is precipitated as calcium phosphate and calcium sulphate.

The overall operation of the system just described may be summarized as follows. The liquid in the waste lagoon, comprising sulphuric acid and heavy metal ions, is neutralized with lime. Calcium sulphate and heavy metal hydroxides precipitate out of the solution. To facilitate their removal, a polyelectrolyte is added, and the mixture is passed into the flocculator where a heavy floc is formed. After leaving the flocculator, the mixture is subjected to mechanical removal of the precipitated matter first by the clarifier, and then by filtration. The precipitated calcium sulphate and heavy metal hydroxides are removed from the system as a sludge, which is dried and easily disposed of.

Dissolved sodium salts, which may be present due to small amounts of sodium in the original waste reach an equilibrium level in the system and excess amounts are removed with water in the sludge. Any precipitated matter which remains in the output of the clarifier is filtered out and returned with the filter backwash to the waste lagoon.

The filtrate contains dissoled calcium sulphate along with residual but significant amounts of dissolved heavy metal ions. These are removed by reverse osmosis in the permeator. Under normal conditions, the filtrate will be saturated with calcium sulphate. Since the permeator tends to increase the concentration of the liquid on the high pressure side of the semi-permeable membrane, the sequestering agent is added to the filtrate in order to prevent the precipitation of solids as a result of the increase in concentration. The sequestering agent is therefore the key to the successful operation of the permeator in this system.

The liquid rejected by the permeator is returned to the waste lagoon, but first, it is treated to destroy the sequestering agent. Sodium hexametaphosphate is preferred as the sequestering agent because its sequestering action is readily destroyed in the presence of lime. Lime may be added from the separate supply to the liquid rejected by the permeator but preferably, in order to simplify the apparatus, the rejected liquid is used to dilute the neutralizing lime.

The process in accordance with this invention produces an effluent which is extremely low in dissolved solids and toxic metal content in comparison with the effluents of conventional processes.

Numerous modifications may be made to the system specifically described herein. For example, other forms of permeator may be used, and other devices for effecting mechanical separation of precipitated matter from the liquid may be used. The process may be carried out in a continuous stream, as described, or individual steps or groups thereof may be carried out separately as batch processes, of desired. Other modifications can be made to the apparatus and process of the invention without departing from its scope as defined in the following claims.

I claim:

1. A process for the treatment of acid waste comprising the steps of:
   a. introducing a lime solution into the acid waste, thereby neutralizing the acid and precipitating calcium sulphate;
   b. mechanically removing precipitated matter from the neutralized waste;
   c. introducing a sequestering agent into the liquid which remains after removal of the precipitated matter, to sequester dissolved calcium;
   d. introducing into a permeator, the liquid which results after the introduction of the sequestering agent and there effecting, by reverse osmosis, a separation of the last mentioned liquid into a first component consisting of essentially pure water, and a second component comprising water and separated calcium: and
   e. introducing the second component into the lime solution prior to the aforementioned introduction of the lime solution into the acid waste, to thereby convert the sequestering agent to a less effective form removable in said mechanical removal or reverse osmosis steps.

2. The process of claim 1 wherein the acid waste is sulphuric acid waste.

3. The process of claim 2 wherein the sequestering agent introduced into the liquid remaining after removal of the precipitated matter is sodium hexametaphosphate.

4. The process of claim 3 wherein substantial quantities of the sodium hexametaphosphate in the second component revert to the orthophosphate form when introduced into the lime solution.

5. The process of claim 4 wherein the sulphuric acid waste also contains heavy metal ions, substantially all the heavy metal ions in the acid waste being separated by the reverse osmosis membrane into the second liquid component.

6. A process for the treatment of heavy metal-containing sulphuric acid waste comprising the steps of:
   a. introducing lime into the acid waste thereby neutralizing the sulphuric acid and precipitating calcium sulphate;
   b. mechanically removing precipitated matter from the neutralized waste;
   c. introducing a sequestering agent into the liquid which remains after removal of the precipitated matter, to sequester dissolved calcium;
   d. introducing the liquid which remains after the introduction of the sequestering agent into a permeator, and there effecting, by reverse osmosis, a separation of the last mentioned liquid into a first component consisting of essentially pure water, and a second component comprising water, heavy metal ions and sequestered calcium;
   e. mixing said second component with strongly alkaline material to convert the sequestering agent to a less effective form;
   f. introducing the mixture of step (e) into the acid waste, whereby calcium from the second component and the sequestering agent converted to a less effective form are removed in the mechanical removal or reverse osmosis steps.

7. The process of claim 6 wherein the converted sequestering agent and the calcium from said second component are mechanically removed.

8. The process of claim 7 wherein the sequestering agent is sodium hexametaphosphate, and wherein the strongly alkaline material mixed with the second component converts the sodium hexametaphosphate to the orthophosphate form.

9. The process of claim 8 wherein the strongly alkaline material is lime.

10. The process of claim 9 wherein the second component is mixed with the lime used to neutralize the acid wastes, prior to the lime being added to the acid waste.

11. The process of claim 10 wherein the step of mechanically removing precipitated matter from the neutralized waste is effected by means of clarification.

12. The process of claim 10 wherein the step of mechanically removing precipitated matter from the neutralized waste is effected by means of clarification followed by filtration.

13. The process of claim 12 wherein the heavy metal containing sulphuric acid waste is waste from the reclamation of lead-sulphuric acid storage batteries.

14. A process for the treatment of heavy-metal containing sulphuric acid waste comprising the steps of:
   a. introducing diluted lime into the acid waste thereby neutralizing the sulphuric acid and precipitating calcium sulphate;
   b. removing the precipitated matter by clarification followed by filtration;
   c. introducing sodium hexametaphosphate as a sequestering agent into the liquid which remains after removal of the precipitated matter, to sequester dissolved calcium;
   d. introducing into a permeator, the liquid which results after the introduction of the sequestering agent and there effecting by reverse osmosis, a separation of the last mentioned liquid into a first component consisting of essentially pure water, and a second component comprising water, heavy metal, and sequestered calcium;
   e. mixing the second compartment with lime to convert at least a portion of the sequestering agent to the orthophosphate form to precipitate at least a portion of the previously sequestered calcium and introducing the lime thus diluted to the acid neutralization step, whereby the calcium thus precipitated and the orthophosphate subsequently are removed by clarification followed by filtration.

* * * * *